Feb. 23, 1960   F. N. ZIMMERMANN ET AL   2,925,783
CENTRIFUGAL PUMP ASSEMBLY
Filed June 13, 1958
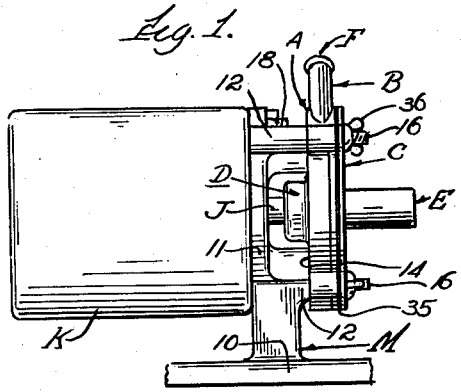
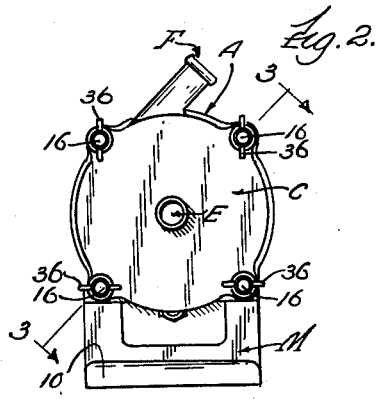
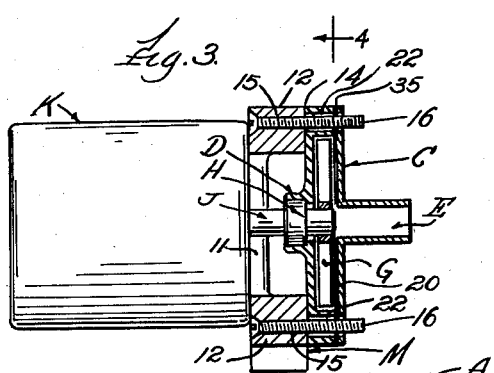
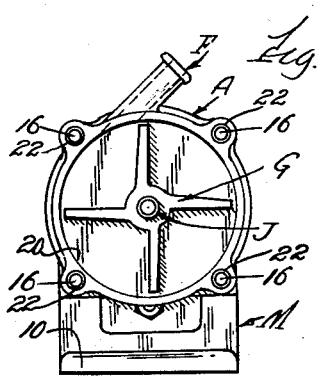
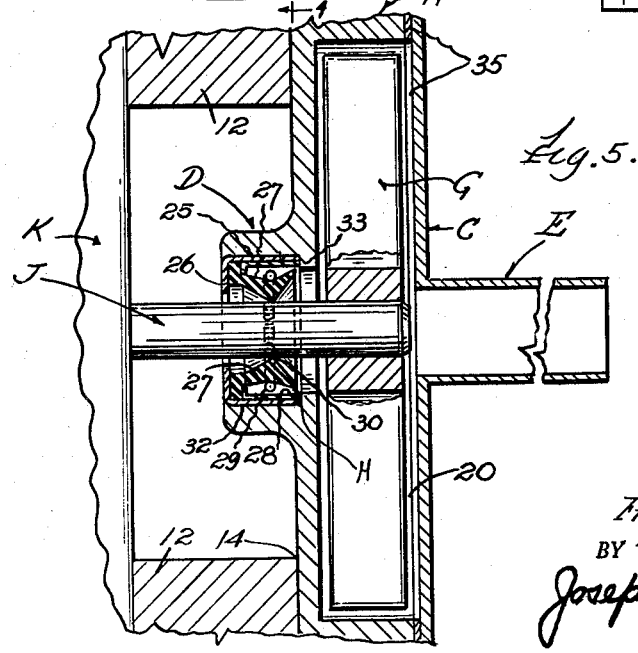
INVENTORS.
Frederick N. Zimmermann
Willy E. Zimmermann
BY Joseph B. Lindecker.
Attorney.

United States Patent Office 2,925,783
Patented Feb. 23, 1960

2,925,783

CENTRIFUGAL PUMP ASSEMBLY

Frederick N. Zimmermann and Willy E. Zimmermann, Chicago, Ill., assignors to March Manufacturing Co., Skokie, Ill., a corporation of Illinois Application June 13, 1958, Serial No. 741,809

10 Claims. (Cl. 103—87)

This invention relates to a pumping apparatus, and more particularly to a self-aligning impeller housing embodying an integrally assembled seal, the seal for use in forming a liquid tight seal between the hub of the impeller casing of a centrifugal pump and the shaft whereby the impeller within the casing is rotated.

One of the objects of this invention is to provide a quick replaceable unit embodying the impeller housing of a pump with the liquid seal-unit, the seal of the seal-unit foming the aligning means therefor.

Another object of the invention is to provide an electric motor and pump housing supporting bracket, the electric motor bolted to one side of the bracket, the bracket embodying pump housing mounting studs projecting from the opposite side thereof from the motor, the pump housing embodying a seal integrally assembled therewith for assembly upon the motor shaft extending from the motor and through the bracket, the housing having enlarged openings therein to fit over the threaded mounting studs, the cover of the housing adapted to fit over the mounting studs, the housing and cover clamped into operating position by wing nuts threaded upon said mounting studs.

A further object of this invention is to provide a pump housing seal unit of this character in which the novel seal unit is made of a stainless steel cage with a non-toxic rubber seal for close engagement with the motor shaft that is approved by the Pure Food specifications, the seal cage being press-fitted into the pump housing and quickly removed with the housing and replaced by a different housing and a new seal embodied therewith when the first seal becomes worn.

A still further object of the invention is to provide a sealing unit of this character in which there is no mechanical contact between the rotating impeller shaft and any part of the sealing unit, thereby avoiding friction and wear and reducing maintenance cost to a minimum.

And still a further object of the invention is to provide a centrifugal pump assembly for pumping orange drinks and other type food drinks, the rotary impeller being mounted directly upon the end of the motor drive shaft of a conventional electric motor, the impeller casing self centered by the shaft seal and locked in position by suitable means whereby any misalignment of the drive shaft, or mounting studs, will not effect any wear upon the seal itself.

And still another object of the invention is the provision of a centrifugal pump assembly, a motor on one side of a mounting bracket and the pump casing mounted upon the opposite side of the bracket, the casing formed with apertures to receive the mounting studs whereby the casing adjusts itself axially about the motor drive shaft without the rubbing of the impeller on the casing or the disturbances of appropriate clearances between the impeller and casing; the shaft of the electric motor being mounted in bearings between the motor housing and extends outwardly, the rubber seal being open and clean and assembled in a stainless steel cage for adjusting the pump casing in proper alignment, and permitting the impeller to be mounted directly upon the end of the motor shaft.

The foregoing objects of this invention, and other objects which will become apparent as the description proceeds, are achieved by the provision of a centrifugal pump including a casing, a horizontal inlet conduit mounted on the removable cover of the casing, a single-entry impeller rotatably mounted in the casing, and mounted upon the end of the electric motor shaft and an outlet conduit being provided on the casing positioned tangentially of the impeller periphery.

For a better understanding of this invention, reference should be had to the accompanying drawings and description where similar characters of reference indicate like parts in the several figures of the drawings:

Figure 1 is a side elevation of the electric motor and pump assembly mounted upon a common mounting bracket;

Figure 2 is an end elevation of the pump assembly and mounting bracket as shown in Fig. 1;

Figure 3 is a side elevation of the invention shown by Fig. 1, with a portion of the mounting bracket and pump assembly shown in section substantially on line 3—3 of Fig. 2;

Figure 4 is an elevation of the assembly shown in Fig. 2 with the casing cover, gasket, and wing-nuts removed, taken substantially on line 4—4 of Fig. 3;

Figure 5 is a fragmentary enlarged sectional view of the liquid seal unit and impeller as shown in Fig. 3.

Referring to the drawing more specifically, A designates a centrifugal pump including a casing B, a cover C, a hub D, an inlet E, an outlet F, an impeller G, and seal-unit H mounted upon shaft J, an electric motor K, mounted upon the common motor and pump casing mounting bracket M embodying this invention.

The mounting bracket M consists of a solid base 10 with a circular rim portion 11 extending vertically thereabove with four outwardly extending bosses 12 with flat vertical mounting surfaces 14, each boss 14 formed with threaded horizontal bores 15 arranged ninety degrees apart and adjacent the outer periphery thereof. Flat-headed mounting studs 16 are assembled in said bore 15 with the free ends extending outwardly therefrom. The motor K is bolted to the circular rim portion 11 of said bracket M by suitable nuts and bolts 18 whereby the motor shaft J extends horizontally through the open central portion of rim portion 11 of bracket M.

The casing B is formed of plastic, or other suitable material, formed with a circular impeller chamber 20 and a rear hub portion D. The casing B has four holes 22 spaced ninety degrees apart extending transversely thereof and in substantially direct alignment with said mounting studs 16. Said holes 22 are of greater diameter than the diameter of said studs 16 whereby the casing will fit loosely upon the studs when mounted thereon in partial assembly before final alignment with motor shaft.

The seal-unit H as here shown comprises a metal sleeve 25 with an inwardly turned flange 26. A non-rotating venturi-shaped bushing 27, or seal, of deformable non-toxic rubber, is horizontally forced into said sleeve 25 and locked therein by an inner metal sleeve 28. The restricted throat portion 30 of said seal 27 is arranged to fit snugly against the motor shaft J. A stainless steel tension type coil spring 29 is assembled about the exterior of the seal 27 in diametrical alignment with the throat portion 30 forcing the snugly fitting seal 27 against, and forming a tight seal upon the surface of the shaft J. The entire seal-unit H is pressed into the cylindrical bore 32 of the hub D, the sleeves 25 and 28 abutting against the flange portion 33 extending inwardly adjacent the impeller chamber 20.

The motor shaft J extends through the seal-unit H, into the impeller chamber 20 and to which end a plastic, or other suitable impeller G is secured by suitable means. The impeller is enclosed within the chamber 20 by a cover C which has four holes arranged ninety degrees apart and adapted to fit over said mounting studs 16. Centrally located in the cover C is integrally secured a tubular inlet E arranged in axial alignment with the motor shaft J. A gasket 35 is provided with four holes therein to fit over studs 16 and is assembled between the casing B and the cover C. The cover C and gasket 35 are tightly secured to the housing, and the housing in turn is tightly secured to the mounting bracket M by turning the wing-nuts 36 in a clockwise direction after the casing has been properly aligned upon said shaft J.

In prior devices of this character the pumps were rigidly secured upon a bracket, the bracket mounted upon a base, the base also supporting a motor to drive the pump. In such assemblies the danger of error and misalignment of parts enters the picture. If and when the pump is so rigidly assembled without regard to the motor shaft and seal-unit, the misalignment of parts will cause wear upon the seal. Applicants' invention provides a common supporting bracket for the motor and the pump, the pump housing aligned with the motor by the seal-unit being applied first and then the housing clamped to the mounting bracket by the mounting studs and wing-nuts arranged thereon. If and when it should be necessary to replace the seal-unit, the cover C is removed, the impeller G is removed from the shaft J, and the pump housing B with the worn seal-unit H is pulled off from said shaft J. A new housing B with a new seal-unit H is then quickly assembled upon said shaft J, the housing aligned by said seal-unit and then clamped with the cover upon said bracket M.

When the pump is fully in operation very little, if any, outward leakage of fluid through the seal-unit along the motor shaft J, and no appreciable amount of air, if any, is sucked in from the outer atmosphere while the pump is operating most efficiently at its fullest capacity.

By installing the mounting bracket in any beverage machine, or any other desired location, by the rotation of the motor shaft, or impeller shaft, the fluid is drawn into the inlet E and forced out the outlet F with ease. The chamber can be effectively flushed and kept in clean and open working condition, the cover C can be easily and quickly removed if desired, whereby there is very little wear of the relatively movable parts.

By our invention the rotating of the impeller causes the fluid to enter the impeller chamber without shock, and be forced outwardly therefrom, the pump operating at a higher efficiency over a wider range of flow.

From the foregoing, it will be recognized that the various objects of our invention have been achieved by the provision of an improved, relatively inexpensive, and highly efficient centrifugal pump characterized by a substantially balanced impeller within a pump housing, the housing accurately aligned upon the motor shaft where wear, thrust and clearance problems have been largely eliminated, and in which the seal-unit can be removed quickly along with the inexpensive pump housing and a new housing with a new seal-unit mounted directly upon the motor shaft, aligned by the seal-unit and again ready for operation.

Having thus described the present invention so that others skilled in the art may be able to understand and practice the same, it will be understood that this embodiment of the invention has been for illustrative purposes only, and that various modifications and embodiments of the present invention may be effected without departing from the novel spirit and scope thereof.

We claim as our invention:

1. A pump assembly of the class described comprising, a mounting bracket, a motor mounted on one side of said bracket, a motor drive shaft extending through an opening in said bracket, a plurality of pump housing mounting studs extending from the side of said bracket opposite to that supporting said motor, a centrifugal pump housing adjustably assembled upon said studs, an impeller chamber in said housing, an impeller in said chamber and attached directly upon the free end of said motor drive shaft extending into a cover forming a wall of said chamber, said housing having a hub and said shaft extending through said hub, a stationary seal-unit secured within said hub, a seal of deformable resilient material fitted within said seal-unit and having sealing contact with the outer surface of said motor drive shaft, said seal in said seal-unit solely aligning said housing upon said motor shaft, and clamping means assembled upon said studs to secure said pump assembly to said bracket according to the alignment effected by said seal.

2. A pump assembly of the class described comprising, a vertical mounting bracket, an electric motor rigidly secured to one side of said bracket, a centrifugal pump adjustably mounted upon the opposite side of said bracket, said pump embodying a pump housing, an impeller chamber within said housing, a liquid inlet and a liquid outlet arranged with said chamber, said housing having a hub, the motor drive shaft extending through an opening in said bracket and said hub with its free end terminating within said impeller chamber, an impeller mounted directly upon said free end of said motor drive shaft, a seal-unit rigidly mounted within said hub, a deformable resilient seal mounted wtihin said seal-unit and having sealing contact with the outer surface of said drive shaft, said seal in said seal-unit solely aligning said pump housing upon said shaft, and said housing secured to said bracket by suitable adjustable means according to the alignment arranged by said seal.

3. A pump assembly of the class described comprising, a vertically arranged mounting bracket, an electric motor rigidly secured to one side of said bracket, threaded mounting studs extending outwardly from said bracket, a pump comprising a pump housing, said housing having openings therein through which said studs extend, said opening in the housing being greater in diameter than the diameter of said studs providing suitable clearance from the threads on said studs, said housing embodying an impeller chamber therein with a liquid inlet and a liquid outlet associated therewith, said housing having a cylindrical hub, the drive shaft of said motor extending through said bracket and said hub with its free end treminating within said impeller chamber, an impeller mounted directly upon said free end of said motor drive shaft, a seal-unit including a resilient seal mounted within said hub, said seal having sealing contact with the outer surface of said drive shaft, said seal of said seal-unit solely aligning said pump housing upon said drive shaft, and said housing secured rigidly to said bracket by suitable threaded means upon the end portions of said studs according to the alignment effected by said seal in said seal-unit.

4. A pump assembly of the class described comprising, a vertical mounting bracket with mounting surfaces on its opposite vertical faces, an electric motor rigidly mounted upon one vertical face of said bracket, a plurality of threaded mounting studs extending outwardly and horizontally from the second vertical face, a pump embodying a pump housing, a plurality of openings in the edge portions of said housing, said openings being greater in width than the diameter of said studs, said studs extending through said openings in said housing, said housing having a cylindrical hub portion, a seal-unit rigidly secured within said hub portion, a resilient seal mounted in said seal-unit, a motor drive shaft from said motor extending through an opening in said bracket and said seal, said seal solely aligning said housing upon said shaft, an impeller rigidly secured upon said motor drive shaft, and said housing rigidly secured to said bracket by suitable threaded clamping means mounted upon said studs according to the alignment effected by said seal in said seal-unit.

5. The pump assembly according to claim 4 wherein said pump housing with said seal-unit are removable and replaceable as a unit upon removal of said threaded clamping means and said impeller.

6. The pump assembly according to claim 1 wherein said pump housing with the rigidly secured seal-unit are replaceable as a unit after removal of said cover from said housing, said impeller from the free end of said motor driveshaft and the complete removal of said clamping means from said studs.

7. The pump assembly according to claim 1 wherein said pump housing has said cover removably mounted upon said studs to enclose said impeller in said impeller chamber and forming a side wall of said impeller chamber, the liquid inlet mounted upon said cover in axial alignment with said motor drive shaft, and said cover tightly sealed to said housing by the clamping means for sealing said housing to said bracket.

8. A pumping apparatus of the class described comprising, a mounting bracket embodying a vertical upright member, an electric motor mounted upon one vertical surface of said bracket, a pump mounted upon the opposite vertical surface of said bracket, a plurality of threaded mounting studs extending horizontally from said bracket toward said pump, said pump comprising a housing, a plurality of openings in said housing, said studs passing freely through said openings, said housing embodying an impeller chamber with one open side, a hollow hub portion, a cover for said chamber, a plurality of openings in said cover, said studs passing freely through said openings in the cover, a motor drive shaft extending from said motor through an opening in said bracket and said hub into said impeller chamber, an impeller directly mounted upon the free end of said motor drive shaft, a seal-unit rigidly mounted within said hub, a resilient seal assembled in said seal-unit and having sealing contact with the outer surface of said shaft, said seal solely aligning said pump housing upon said shaft, a liquid inlet connected with said cover, a liquid outlet connected with said impeller chamber, and said housing and cover rigidly secured to said bracket by threaded nuts mounted upon the end portions of said studs and in tight engagement therewith according to the alignment effected by said seal in said seal unit.

9. In a pumping unit of the type described, comprising a supporting bracket having an electric motor supported upon one side thereof and a plurality of threaded mounting studs extending horizontally and outwardly from the opposite side thereof, a motor drive shaft supported within said motor and extending through an opening in said bracket beneath said studs, a pump embodying a pump housing, said housing having a hollow hub, a seal-unit within said hub, a deformable venturi-shaped seal within said seal-unit, said housing mounted upon said shaft with the narrow throat of said seal in pressing contact with said shaft, said housing provided with said bores to freely pass over said studs, said seal solely aligning said housing upon said shaft, an impeller chamber within said housing, an impeller upon the free end of said motor drive shaft extending into said chamber, a cover closing said chamber and embodying axial bores to freely pass over said studs, and clamping nuts threaded upon said studs to clamp said cover to said housing and said housing to said bracket in the alignment effected by said seal.

10. In a pumping unit according to claim 9 wherein said housing is made of plastic material, said seal being made up of non-toxic rubber of a venturi configuration, a stainless steel coil spring in clamping engagement with the exterior surface of said seal and in vertical alignment with the throat of said seal.

References Cited in the file of this patent

UNITED STATES PATENTS

| 2,047,330 | Peterson | July 14, 1936 |
| 2,441,708 | Luaces et al. | May 18, 1948 |
| 2,688,930 | De Moss | Sept. 14, 1954 |
| 2,779,611 | Wernert | Jan. 29, 1957 |
| 2,784,673 | Namur | Mar. 12, 1957 |

FOREIGN PATENTS

| 1,092,549 | France | Apr. 22, 1955 |